US012709719B2

(12) United States Patent
Cabanas et al.

(10) Patent No.: US 12,709,719 B2
(45) Date of Patent: Aug. 18, 2026

(54) HARDNESS ADDITIVE COMPRISING A FOUR CHELANT MIXTURE AND BLOCK DETERGENTS CONTAINING SAID MIXTURE TO IMPROVE EDGE HARDENING

(71) Applicant: ECOLAB USA INC., Saint Paul, MN (US)

(72) Inventors: Jesus Cabanas, Saint Paul, MN (US); Gerald Phan, Saint Paul, MN (US); Yoshiyuki Sato, Ota (JP); Tomoko Nakabayashi, Saitama (JP); Masahiro Takaoka, Kawaguchi (JP); John Mansergh, Saint Paul, MN (US); Carter M. Silvernail, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 236 days.

(21) Appl. No.: 18/762,815

(22) Filed: Jul. 3, 2024

(65) Prior Publication Data

US 2024/0352382 A1 Oct. 24, 2024

Related U.S. Application Data

(63) Continuation of application No. 18/465,320, filed on Sep. 12, 2023, now Pat. No. 12,065,629, which is a continuation of application No. 17/814,592, filed on Jul. 25, 2022, now Pat. No. 11,788,032, which is a continuation of application No. 16/804,377, filed on Feb. 28, 2020, now Pat. No. 11,421,186.

(60) Provisional application No. 62/811,656, filed on Feb. 28, 2019.

(51) Int. Cl.

| | |
|---|---|
| ***C11D 3/33*** | (2006.01) |
| ***C11D 1/72*** | (2006.01) |
| ***C11D 3/10*** | (2006.01) |
| ***C11D 3/37*** | (2006.01) |
| ***C11D 3/386*** | (2006.01) |
| ***C11D 17/04*** | (2006.01) |

(52) U.S. Cl.

CPC .............. *C11D 3/3761* (2013.01); *C11D 1/72* (2013.01); *C11D 3/10* (2013.01); *C11D 3/33* (2013.01); *C11D 3/386* (2013.01); *C11D 17/044* (2013.01)

(58) Field of Classification Search

CPC .... C11D 3/33; C11D 3/37; C11D 1/72; C11D 3/10; C11D 3/386; C11D 17/04; C11D 1/66

See application file for complete search history.

(56) References Cited

U.S. PATENT DOCUMENTS

| | | | |
|---|---|---|---|
| 4,933,101 | A | 6/1990 | Cilley et al. |
| 4,941,988 | A | 7/1990 | Wise |
| 5,691,296 | A | 11/1997 | Agar et al. |
| 5,968,539 | A | 10/1999 | Beerse et al. |
| 6,172,030 | B1 | 1/2001 | Wada et al. |
| 6,207,636 | B1 | 3/2001 | Benjamin et al. |
| 6,333,005 | B1 | 12/2001 | Nguyen |
| 6,589,927 | B1 | 7/2003 | Kott et al. |
| 7,053,039 | B2 | 5/2006 | Burt et al. |
| 7,135,448 | B2 | 11/2006 | Lentsch et al. |
| 7,442,356 | B2 | 10/2008 | Matsubara et al. |
| 7,446,082 | B2 | 11/2008 | Kilkenny et al. |
| 7,659,354 | B2 | 2/2010 | Song et al. |
| 7,759,300 | B2 | 7/2010 | Besse et al. |
| 7,763,576 | B2 | 7/2010 | Tjelta et al. |
| 8,030,038 | B2 | 10/2011 | DiCosimo et al. |
| 8,198,228 | B2 | 6/2012 | Tjelta et al. |
| 8,222,196 | B2 | 7/2012 | Smith et al. |
| 8,343,283 | B2 | 1/2013 | Nijburg |
| 8,618,035 | B2 | 12/2013 | Lai et al. |
| 8,802,611 | B2 | 8/2014 | Miralles |
| 8,815,791 | B2 | 8/2014 | Neplenbroek et al. |
| 8,822,403 | B2 | 9/2014 | Olson et al. |
| 8,876,982 | B2 | 11/2014 | Neplenbroek et al. |
| 9,127,235 | B2 | 9/2015 | Silvernail et al. |
| 9,464,261 | B2 | 10/2016 | Nekmard et al. |
| 9,487,738 | B2 | 11/2016 | Walters et al. |
| 9,624,119 | B2 | 4/2017 | Dotzauer et al. |
| 9,796,947 | B2 | 10/2017 | Roerdink Lander et al. |
| 10,196,592 | B2 | 2/2019 | Pham et al. |
| 10,472,596 | B2 | 11/2019 | Lang et al. |
| 2005/0261159 | A1 | 11/2005 | Parris et al. |
| 2005/0272629 | A1 | 12/2005 | Hasumi et al. |
| 2011/0017239 | A1 | 1/2011 | VanLoyen |
| 2011/0305652 | A1 | 12/2011 | Hilvert et al. |
| 2012/0115766 | A1 | 5/2012 | Nojima et al. |
| 2012/0318303 | A1 | 12/2012 | Miralles et al. |
| 2013/0210692 | A1 * | 8/2013 | Gutowski ............ C11D 3/3757 510/218 |

(Continued)

FOREIGN PATENT DOCUMENTS

| | | | |
|---|---|---|---|
| CN | 104710897 | A | 6/2015 |
| CN | 105776264 | A | 7/2016 |

(Continued)

*Primary Examiner* — Charles I Boyer

(74) *Attorney, Agent, or Firm* — McKee, Voorhees & Sease, PLC

(57) ABSTRACT

Solid detergent compositions designed to maintain solid integrity throughout production of the pressed solid, during mechanical conveying and during ejection from molds, are disclosed. Solid detergent compositions having unexpected immediate block hardness without a curing step are provided by inclusion of a hardness additive composition comprising a synergistic ratio of polycarboxylic acid polymer chelants to aminocarboxylate chelants. Methods of making solid detergent compositions and solid detergent compositions having at least substantially similar cleaning performance to solid detergent compositions without the hardness additive composition are also provided.

15 Claims, 4 Drawing Sheets

(56) References Cited

U.S. PATENT DOCUMENTS

| | | | | |
|---|---|---|---|---|
| 2014/0121150 | A1 | 5/2014 | Walters et al. | |
| 2014/0369953 | A1 | 12/2014 | Purschwitz et al. | |
| 2015/0218495 | A1 | 8/2015 | Miralles et al. | |
| 2015/0299619 | A1* | 10/2015 | Partain, III ............ | C11D 3/227 510/276 |
| 2016/0068789 | A1* | 3/2016 | Dahlquist Howlett .. | C11D 7/16 510/218 |
| 2016/0102274 | A1 | 4/2016 | Smith et al. | |
| 2017/0058239 | A1 | 3/2017 | Hartmann et al. | |
| 2017/0260480 | A1 | 9/2017 | Stolte et al. | |
| 2017/0298304 | A1 | 10/2017 | Vesterager | |
| 2018/0282665 | A1 | 10/2018 | Mansergh et al. | |
| 2018/0312783 | A1 | 11/2018 | Mansergh et al. | |
| 2018/0371381 | A1 | 12/2018 | Olson et al. | |
| 2019/0102085 | A1 | 4/2019 | Yang et al. | |
| 2019/0177664 | A1 | 6/2019 | Hansen et al. | |
| 2019/0276773 | A1 | 9/2019 | Olson et al. | |
| 2019/0284512 | A1 | 9/2019 | Lundberg et al. | |

FOREIGN PATENT DOCUMENTS

| | | | |
|---|---|---|---|
| CN | 107937146 | A | 4/2018 |
| EP | 1232240 | B1 | 8/2002 |
| EP | 2537897 | B1 | 12/2012 |
| EP | 2791309 | B1 | 10/2014 |
| EP | 3323838 | A1 | 5/2018 |
| EP | 3354715 | A1 | 8/2018 |
| EP | 2711413 | B1 | 11/2018 |
| JP | 9227899 | A | 9/1997 |
| JP | 9263790 | A | 10/1997 |
| JP | 3268339 | B2 | 3/2002 |
| JP | 4796824 | B2 | 10/2011 |
| JP | 2017186549 | A | 10/2017 |
| MX | 2012012660 | A | 12/2012 |
| MX | 2013000430 | A | 2/2013 |
| WO | 9830664 | A1 | 7/1998 |
| WO | 0144424 | A1 | 6/2001 |
| WO | 0206433 | A1 | 1/2002 |
| WO | 2012007438 | A1 | 1/2012 |
| WO | 2012084426 | A1 | 6/2012 |
| WO | 2015054471 | A1 | 4/2015 |
| WO | 2015054481 | A1 | 4/2015 |
| WO | 2016079110 | A2 | 5/2016 |
| ZA | 20037505 | | 9/2004 |
| ZA | 201006902 | B | 9/2012 |

* cited by examiner

HARDNESS ADDITIVE COMPRISING A FOUR CHELANT MIXTURE AND BLOCK DETERGENTS CONTAINING SAID MIXTURE TO IMPROVE EDGE HARDENING

CROSS-REFERENCE TO RELATED APPLICATIONS

This application is a continuation of U.S. Ser. No. 18/465,320, filed Sep. 12, 2023, which is a continuation application of U.S. Ser. No. 17/814,592, filed Jul. 25, 2022, now U.S. Pat. No. 11,788,032, issued Oct. 17, 2023, which is a continuation application of U.S. Ser. No. 16/804,377, filed Feb. 28, 2020, now U.S. Pat. No. 11,421,186, issued Aug. 23, 2022, which claims priority under 35 U.S.C. § 119 to Provisional Application U.S. Ser. No. 62/811,656 filed Feb. 28, 2019.

FIELD OF THE INVENTION

The invention relates to solid detergent compositions designed to maintain solid integrity throughout production of the pressed solid, during mechanical conveying and during ejection from molds. The solid detergent compositions provide solids having unexpected immediate block hardness without a curing step that surpasses solid compositions as a result of a hardness additive composition employing dispersant polymers therein. The hardness additive compositions contain a synergistic ratio of dispersant polymers, namely polycarboxylic acid polymer chelants, to aminocarboxylate chelants. Methods of making solid detergent compositions and solid detergent compositions are also provided.

BACKGROUND OF THE INVENTION

Conventional solid compositions, including solid detergents, can be made by various solidification techniques. These include casting a melted composition, extrusion and forming of blocks or tablets at high pressures in a tablet press. Each of these methods of making solids has significant limitations. For example, an expensive tablet press can apply its high pressures only to form tablet or puck sized solids. A tablet press is not suitable for making solid blocks. Casting requires melting the composition to form a liquid. Melting consumes energy and can destroy certain desirable ingredients in some cleaning products. Extruding requires expensive equipment and advanced technical know-how.

There remains a need for additional methods for making solid compositions and for compositions that can be made by these methods.

Accordingly, it is an objective of the claimed compositions to formulate a hardness additive composition employing dispersant polymers suitable for use in various compositions, including solid detergent compositions, to provide improved solid block hardness/rigidity.

A further object of the compositions and hardness additive compositions is to provide block hardness/rigidity immediately upon completion of block pressing, namely without requiring a curing step for the solidification.

A still further object of the compositions and hardness additive compositions is to reduce or eliminate chips, gauges, brittle edges and other structural weaknesses of the pressed solids that result in product loss from the solid.

Other objects, advantages and features of the detergent compositions disclosed herein and use thereof will become apparent from the following specification taken in conjunction with the accompanying drawings.

BRIEF SUMMARY OF THE INVENTION

An advantage of the hardness additive compositions and the solid compositions containing the same disclosed herein and use thereof is the improved hardness of the solid compositions. The solids do not have brittle or fragile edges causing loss of solid material.

In one aspect, provided here are solid hardness additive compositions comprising: at least one polycarboxylic acid polymer chelant comprising a polyacrylate or polyacrylic acid polymer or homopolymer from about 5 wt-% to about 40 wt-% of the composition; and at least one aminocarboxylate chelant comprising one or more of ethylenediamine-N,N-tetraacetic acid (EDTA), methylglycinediacetic acid (MGDA), and L-glutamic acid, N,N-diacetic acid (GLDA) from about 60 wt-% to about 95 wt-% of the composition, wherein the ratio of polycarboxylic acid polymer chelant(s) to polyacrylate or polyacrylic acid polymer has at one of the following ratios: (A) the ratio of polycarboxylic acid polymer chelant(s) to L-glutamic acid, N,N-diacetic acid (GLDA) or salt thereof in combination with ethylenediamine-N,N-tetraacetic acid (EDTA) or salt thereof, is between about 0.17:1 to about 0.42:1; (B) the ratio of polycarboxylic acid polymer chelant(s) to methylglycinediacetic acid (MGDA) or salt thereof, is between about 0.06:1 to about 0.12:1; and/or (C) the ratio of polycarboxylic acid polymer chelant(s) to ethylenediamine-N,N-tetraacetic acid (EDTA) or salt thereof, is between about 0.2:1 to about 0.5:1.

In other embodiments, solid detergent compositions comprise: the solid hardness additive composition, an alkalinity source, at least one nonionic surfactant, wherein the polycarboxylic acid polymer chelant of the hardness additive composition comprises less than about 4 wt-%, preferably less than or equal to about 2 wt-% of the composition.

In another aspect, provided here are methods of making solid compositions comprising: combining a hardness additive composition with an alkalinity source, at least one surfactant and at least one additional functional ingredient; mixing to form a homogenous mixture; and pressing in a mold to form a solid composition, wherein the solid is a block having edge hardness immediately upon pressing and removal from the mold.

While multiple embodiments are disclosed, still other embodiments of the detergent compositions disclosed herein will become apparent to those skilled in the art from the following detailed description, which shows and describes illustrative embodiments of the detergent compositions disclosed herein. Accordingly, the drawings and detailed description are to be regarded as illustrative in nature and not restrictive.

Figure 1:
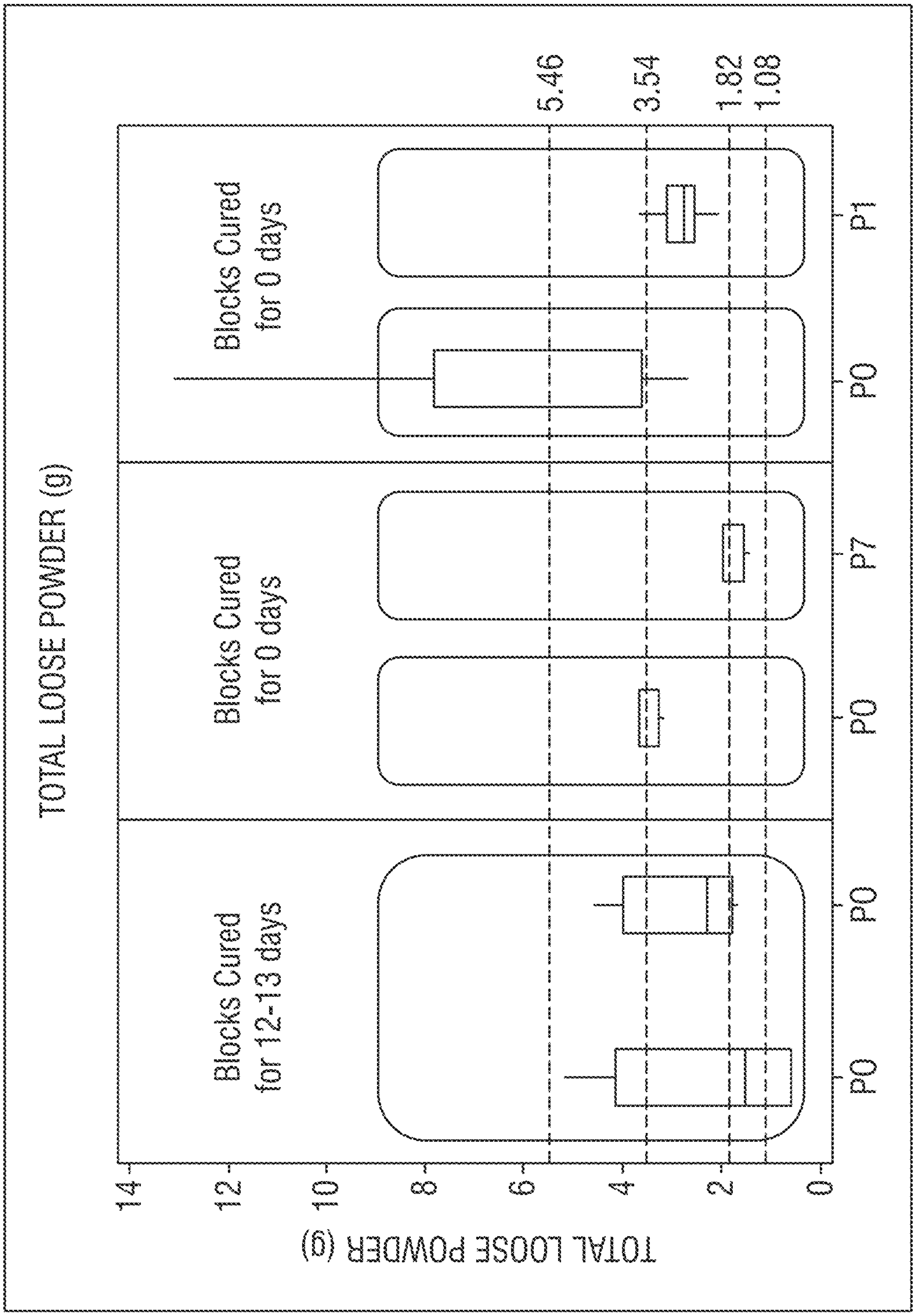
FIG. 1 shows a boxplot of total loose powder lost at three pressed solid runs comparing Control formulations (without the hardness additive composition) with formulations containing hardness additive compositions to demonstrate improvement in immediate block edge hardness.

Various embodiments of the detergent compositions disclosed herein will be described in detail with reference to the drawings, wherein like reference numerals represent like parts throughout the several views. Reference to various embodiments does not limit the scope of the compositions and methods disclosed herein and use thereof. Figures represented herein are not limitations to the various embodiments according to the detergent compositions disclosed herein and are presented for exemplary illustration of the detergent compositions disclosed herein.

DETAILED DESCRIPTION OF THE PREFERRED EMBODIMENT

The embodiments of the detergent compositions, hardness additive compositions and methods of making the same and use thereof, disclosed herein are not limited to particular detergent compositions, which can vary and are understood by skilled artisans and can be included as additive systems for various compositions, including for example solids that are soft or sticky and are in need of immediate hardening. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects or embodiments of the compositions or methods disclosed herein are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the detergent compositions and hardness additive compositions disclosed herein and use thereof may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "scrap rate" refers to the number or amount of solid compositions that are not suitable for use. It is desired that a scrap rate of less than about 5%, and preferably less than about 3%, and most preferably about 0% is achieved by using the hardness additive compositions. For commercial or large scale production of solid block compositions, a scrap rate can be calculated based upon the total number of blocks that are defective and therefore cannot be used. For example, in 1 year if 316,000 kg of solid compositions are produced this could equate to 105,334 blocks, and a 5% scrap rate would equate to <5267 defective blocks, and a more preferred 3% scrap rate would equate to <3160 defective blocks. For purposes of calculating a scrap rate in experimental conditions, such as the Examples described herein, scrap rate is defined in terms of the total amount of lost loose powder from a solid block composition, which his indicative of the scrap rate in a commercial production.

As used herein, the term "soil" refers to polar or non-polar organic or inorganic substances including, but not limited to carbohydrates, proteins, fats, oils and the like. These substances may be present in their organic state or complexed to a metal to form an inorganic complex.

As used herein, the term "substantially free", "free", "substantially free of" or "free of" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both. As referred to herein, the solid detergent compositions comprising the hardness additive compositions provide solid detergents with substantially similar cleaning performance as solid detergent compositions without the hardness additive compositions.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, hardness additive compositions and the detergent compositions disclosed herein may comprise, consist essentially of, or consist of the components and ingredients of the hardness additive compositions and/or detergent compositions disclosed herein as well as other ingredients not described herein. As used herein, "consisting essentially of" means that the methods and compositions may include additional steps, components or ingredients, but only if the additional steps, components or ingredients do not materially alter the basic and novel characteristics of the claimed methods and compositions.

Hardness Additive Compositions

The hardness additive compositions are suitable for various solid compositions, including for example, solid detergent compositions to improve hardness, namely block edge rigidity immediately after pressing of the solid composition. Beneficially, the hardness additive compositions when added to various solid compositions, such as solid detergent compositions, solid formulations that have a sticky consistency and would benefit from the enhanced hardening, caustic formulations, manual detergents, laundry detergents and the like. As a further benefit, the compositions do not require a curing steps for solidification to increase the strength or hardness of the solids, including the edges which are known to be the most fragile and brittle portions of a pressed solid. This immediate improvement in hardness upon pressing of solid compositions is an unexpected advancement in the formulation of various alkaline compositions which can be formed into solids through pressing.

Without being limited to a particular mechanism of action for the improvement in hardness of the solid compositions, the hardness additive composition provides a ratio of dispersant polymers which are chelants, namely polycarboxylic acid polymer chelants, as a block hardening additive to aminocarboxylate chelants for water hardness inhibition, the combination of which synergistically harden the composition. It is unexpected that certain combinations of chelants provide improved solid hardness. Chelants are known as molecules capable of coordinating (i.e., binding) the metal ions commonly found in natural water to prevent the metal ions from interfering with the action of the other detersive ingredients of a cleaning composition. However, when the hardness additive compositions are included in solid compositions they are employed at unique ratios of the polycarboxylic acid polymer chelants to aminocarboxylate chelants, and moreover the polycarboxylic acid polymer chelant (e.g. Acusol polymers) are combined in a solid composition on a weight basis of less than about 4 wt-% and preferably about 2 wt-%. These are lower concentrations that convention use of the polycarboxylic acid polymer for chelation.

Exemplary ranges of the hardness additive compositions are shown in Table 1 in weight percentage of the compositions. In various embodiments, the hardness additive compositions are provided as a premix with the at least two, or at least three components provided. In an embodiment, the hardness additive composition provided as a premix for a solid composition is a liquid premix.

TABLE 1

| Material | First Exemplary Range wt-% | Second Exemplary Range wt-% | Third Exemplary Range wt-% | Fourth Exemplary Range wt-% |
|---|---|---|---|---|
| Polycarboxylic Acid Polymer Chelant(s) | 5-40 | 10-35 | 10-30 | 10-25 |
| Aminocarboxylate Chelant(s) | 60-95 | 65-90 | 70-90 | 75-90 |

In some embodiments, the ratio of the polycarboxylic acid polymer chelant(s) to aminocarboxylate chelant(s) provides synergistically improved hardening of the blocks. In an embodiment, the ratio of polycarboxylic acid polymer chelant(s) to aminocarboxylate, preferably to methylglycinediacetic acid (MGDA) or salt thereof, is at least about 0.06:1, at least about 0.1:1, at least about 0.12:1, at least about 0.48:1, or ratios there between, including for example about 0.06:1 to about 0.48:1, or about 0.06:1 to about 0.12:1. In a further embodiment, the ratio of polycarboxylic acid polymer chelant(s) to aminocarboxylate, preferably to L-glutamic acid, N,N-diacetic acid (GLDA) or salt thereof in combination with ethylenediamine-N,N-tetraacetic acid (EDTA) or salt thereof, is at least about 0.17:1 to about 0.42:1. In a still further embodiment, the ratio of polycarboxylic acid polymer chelant(s) to aminocarboxylate, preferably to ethylenediamine-N,N-tetraacetic acid (EDTA) or salt thereof, is between about 0.2:1 to about 0.5:1. In addition, without being limited according to the detergent compositions disclosed herein, all ranges for the ratios recited are inclusive of the numbers defining the range and include each integer within the defined range of ratios.

In preferred embodiments, the ratio of polycarboxylic acid polymer chelant(s) to polyacrylate or polyacrylic acid polymer has at least one of the following rations and/or at least two of the following ratios: (A) ratio of polycarboxylic acid polymer chelant(s) to L-glutamic acid, N,N-diacetic acid (GLDA) or salt thereof in combination with ethylenediamine-N,N-tetraacetic acid (EDTA) or salt thereof, is between about 0.17:1 to about 0.42:1; (B) ratio of polycarboxylic acid polymer chelant(s) to methylglycinediacetic acid (MGDA) or salt thereof, is between about 0.06:1 to about 0.48:1, or about 0.06:1 to about 0.12:1; and (C) the ratio of polycarboxylic acid polymer chelant(s) to ethylenediamine-N,N-tetraacetic acid (EDTA) or salt thereof, is between 0.2:1 to about 0.5:1. In a still further preferred embodiment, the ratio of polycarboxylic acid polymer chelant(s) to polyacrylate or polyacrylic acid polymer meets all three of the aforementioned ratios.

In some embodiments, in addition to the ratios of the polycarboxylic acid polymer chelants to the polyacrylate or polyacrylic acid polymers, there is a preferred total amount of a premix containing the hardness additives added to the solid compositions. In a preferred embodiment less than about 15 wt-% of the hardness additive composition premix is added to a solid composition, preferably less than about 14 wt %, preferably less than about 13 wt %, preferably less than about 12 wt %, preferably less than about 11 wt %, preferably less than about 10 wt %, or most preferably less than about 9 wt % of the hardness additive composition premix is added to a solid composition.

Solid Detergent Compositions

The hardness additive compositions are suitable for inclusion in various solid compositions, including detergent compositions such as alkali metal alkaline detergents for cleaning a variety of industrial and consumer surfaces. Exemplary ranges of the detergent compositions are shown in Tables 2A-2B in weight percentage of the solid detergent compositions. In Table 2A the hardness additive composition can be provided as a premix, namely a liquid premix. One or more additional premixes can be included in the formulations, such as a liquid premix of surfactants.

TABLE 2A

| Material | First Exemplary Range wt-% | Second Exemplary Range wt-% | Third Exemplary Range wt-% | Fourth Exemplary Range wt-% |
|---|---|---|---|---|
| Hardness Additive Composition | 5-50 | 5-45 | 8-40 | 8-35 |
| Alkalinity source | 20-90 | 30-80 | 40-80 | 50-80 |
| Surfactants | 0.1-25 | 0.1-20 | 1-20 | 2-15 |

TABLE 2A-continued

| Material | First Exemplary Range wt-% | Second Exemplary Range wt-% | Third Exemplary Range wt-% | Fourth Exemplary Range wt-% |
|---|---|---|---|---|
| Additional Functional Ingredients | 0-25 | 0-20 | 0-10 | 0-5 |

TABLE 2B

| Material | First Exemplary Range wt-% | Second Exemplary Range wt-% | Third Exemplary Range wt-% | Fourth Exemplary Range wt-% |
|---|---|---|---|---|
| Polycarboxylic Acid Polymer Chelant(s) | 0.1-5 | 0.5-5 | 1-4 | 1-2 |
| Aminocarboxylate Chelant(s) | 5-45 | 5-40 | 5-35 | 5-30 |
| Alkalinity source | 20-90 | 30-80 | 40-80 | 50-80 |
| Surfactants | 1-25 | 1-20 | 1-15 | 2-15 |
| Additional Functional Ingredients | 0-25 | 0-20 | 0-10 | 0-5 |

The detergent compositions disclosed herein may be solid concentrate compositions. A "solid" composition refers to a composition in the form of a solid such as a powder, a particle, agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F., 112° F., and preferably 120° F. The pressed solids may take any form including a block. When referring to pressed solid it is meant that the hardened composition will not flow perceptibly and will substantially retain its shape under moderate stress, pressure, or mere gravity. For example, the solid maintains the shape of a mold when removed from the mold. Although the degree of hardness of the solid compositions can range in degree of hardness, it is desired that a pressed solid containing a hardness additive composition have the hardness of a fused solid block, which is relatively dense and hard similar to concrete.

The detergent compositions containing the hardness additive compositions are beneficially free of chips and gauges in the solid blocks. As a further benefit, the solid blocks do not display brittle edges and can beneficially withstand physical stress from the pressing, conveying and packaging systems employed.

The detergent compositions disclosed herein can be made available as concentrates that are diluted (or as multiple concentrates that are diluted and combined) prior to or at the point of use to provide a use solution for applications on a variety of surfaces, namely hard surfaces. An advantage of providing concentrates that are later combined or diluted is that shipping and storage costs can be reduced because it can be less expensive to ship and store a concentrate rather than a use solution and is also more sustainable because less packaging is used.

Polycarboxylic Acid Polymer Chelants

The hardness additive compositions (and solid compositions employing the same) include at least one polycarboxylic acid polymer chelant, which is the dispersant polymer in the hardness additive compositions. These chelants are also known as water treatment polymers. Polycarboxylic acid polymer chelants are non-phosphorus containing chelants. Polycarboxylates include those chelant polymers having pendant carboxylate (—CO2—) groups such as polyacrylic acid homopolymers, polymaleic acid homopolymers, maleic/olefin copolymers, sulfonated copolymers or terpolymers, acrylic/maleic copolymers or terpolymers polymethacrylic acid homopolymers, polymethacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at sub stoichiometric levels to function as crystal modifiers.

Polycarboxylic acid polymer chelants can include, polyacrylic acid homopolymers and polymaleic acid homopolymers, and polymers modified by a fatty acid end group. Exemplary polyacrylic acid homopolymers include those with a molecular weight between about 500-100,000 g/mol, or between about 1,000-50,000 g/mol, or between about 1,000-25,000 g/mol. Exemplary suitable commercially available polyacrylic acid polymers include Acusol 445N (a fully neutralized homopolymer of acrylic acid), Acusol 448 and Acusol 944 available from Dow Chemical.

In additional embodiments, mixtures of acrylic acid homopolymers and/or polymers including acrylate monomers can be employed.

In an embodiment, the hardness additive compositions disclosed herein include from about 5 wt-% to about 40 wt-% of the polycarboxylic acid polymer chelant, from about 10 wt-% to about 35 wt-% of the polycarboxylic acid polymer chelant, from about 10 wt-% to about 30 wt-% of the polycarboxylic acid polymer chelant, preferably from about 10 wt-% to about 25 wt-% of the polycarboxylic acid polymer chelant. In addition, without being limited according to the detergent compositions disclosed herein, all ranges recited are inclusive of the numbers defining the range and include each integer within the defined range.

In a still further embodiment, the solid detergent compositions containing the hardness additive composition include from about 0.1 wt-% to about 5 wt-% of the polycarboxylic acid polymer chelant, from about 0.5 wt-% to about 5 wt-% of the polycarboxylic acid polymer chelant, from about 1 wt-% to about 5 wt-% of the polycarboxylic acid polymer chelant, from about 1 wt-% to about 4 wt-% of the polycarboxylic acid polymer chelant, or from about 1 wt-% to about 2 wt-% of the polycarboxylic acid polymer chelant. In addition, without being limited according to the detergent compositions disclosed herein, all ranges recited are inclusive of the numbers defining the range and include each integer within the defined range.

Aminocarboxylate Chelants

The hardness additive compositions (and solid compositions employing the same) include at least one aminocarboxylate (or aminocarboxylic acid) chelant. In a preferred embodiment, the aminocarboxylate includes aminocarboxylic acid materials containing little or no NTA or the detergent compositions disclosed herein are free of NTA. Exemplary aminocarboxylates include, for example, N-hydroxyethylaminodiacetic acid, ethylenediaminetetraacetic acid (EDTA) (also referred to herein as ethylenediamine-N,N-tetraacetic acid, 2,2',2'',2'''-(Ethane-1,2-diyldinitrilo)tetraacetic acid), methylglycinediacetic acid (MGDA), hydroxyethylenediaminetetraacetic acid, diethylenetriaminepentaacetic acid, N-hydroxyethyl-ethylenediaminetriacetic acid (HEDTA), L-glutamic acid, N,N-diacetic acid (GLDA), diethylenetriaminepentaacetic acid (DTPA), Iminodisuccinic acid (IDS), ethylenediamine disuccinic acid (EDDS), 3-hydroxy-2,2-iminodisuccinic acid (HIDS), hydroxyethyliminodiacetic acid (HEIDA) and other similar acids having an amino group with a carboxylic acid substituent. In an embodiment, the aminocarboxylate is ethylenediaminetetraacetic acid (EDTA).

In a preferred embodiment the aminocarboxylate comprises, consists of or consists essentially of: ethylenediamine-N,N-tetraacetic acid, methylglycinediacetic acid, and L-glutamic acid, N,N-diacetic acid.

In various aspects, the hardness additive compositions and solid detergent compositions employ chelants that are substantially free of NTA-containing compounds, making the composition more environmentally acceptable.

In an embodiment, the hardness additive compositions disclosed herein include from about 60 wt-% to about 95 wt-% of the aminocarboxylate chelants, from about 65 wt-% to about 90 wt-% of the aminocarboxylate chelants, from about 70 wt-% to about 90 wt-% of the aminocarboxylate chelants, preferably from about 75 wt-% to about 90 wt-% of the aminocarboxylate chelants. In addition, without being limited according to the detergent compositions disclosed herein, all ranges recited are inclusive of the numbers defining the range and include each integer within the defined range.

In a still further embodiment, the solid detergent compositions containing the hardness additive composition include from about 5 wt-% to about 45 wt-% of the aminocarboxylate chelant, from about 5 wt-% to about 40 wt-% of the aminocarboxylate chelant, from about 5 wt-% to about 35 wt-% of the aminocarboxylate chelant, from about 5 wt-% to about 30 wt-% of the aminocarboxylate chelant, or from about 5 wt-% to about 25 wt-% of the aminocarboxylate chelant. In addition, without being limited according to the detergent compositions disclosed herein, all ranges recited are inclusive of the numbers defining the range and include each integer within the defined range.

Alkalinity Source

In an embodiment, the detergent compositions disclosed herein include an alkalinity source. In an embodiment, the alkalinity source is preferably an alkali metal hydroxide and/or alkali metal carbonate. Suitable alkali metal hydroxides and carbonates include, but are not limited to sodium carbonate, potassium carbonate, sodium hydroxide and potassium hydroxide. In another embodiments, the alkali metal carbonates and alkali metal hydroxides are further understood to include bicarbonates and sesquicarbonates. According to the detergent compositions disclosed herein, any "ash-based" or "alkali metal carbonate" shall also be understood to include all alkali metal carbonates, bicarbonates and/or sesquicarbonates. In a preferred embodiment, the alkalinity source is an alkali metal carbonate. In some other preferred embodiments, the alkalinity source is an alkali metal carbonate, free of any unreacted alkali metal hydroxide. In further preferred embodiments, the alkaline cleaning compositions do not include organic alkalinity sources.

The alkalinity source is provided in an amount sufficient to provide a use solution of the detergent composition disclosed herein with a pH of at least about 8, at least about 9, at least about 10, at least about 11, or at least about 12. The use solution pH range is preferably between about 8.0 and about 13.0, and more preferably between about 10 to 12.5.

In an embodiment, the detergent compositions include from about 20 wt-% to about 90 wt-% of the alkalinity source, from about 20 wt-% to about 80 wt-% of the alkalinity source, from about 30 wt-% to about 80 wt-% of the alkalinity source, from about 40 wt-% to about 80 wt-% of the alkalinity source, from about 40 wt-% to about 75 wt-% of the alkalinity source, and preferably from about 50 wt-% to about 80 wt-% of the alkalinity source. In addition, without being limited according to the detergent compositions disclosed herein, all ranges recited are inclusive of the numbers defining the range and include each integer within the defined range.

Additional Functional Ingredients

The components of the claimed detergent compositions can further be combined with various functional components suitable for use in ware wash and other applications employing an alkaline detergent or cleaning composition. In some embodiments, the claimed detergent compositions including the hardness additive composition (including polycarboxylic acid polymer chelant(s) and aminocarboxylate chelant(s)), alkalinity source, nonionic surfactant, and optional additional chelants/builders make up a large amount, or even substantially all of the total weight of the detergent compositions. For example, in some embodiments few or no additional functional ingredients are disposed therein.

In other embodiments, additional functional ingredients may be included in the claimed detergent compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

In preferred embodiments, the detergent compositions do not include the chelant NTA. In further preferred embodiments, the detergent compositions do not include silicates. In still further preferred embodiments, the detergent compositions do not include phosphates and/or phosphonates. In still further preferred embodiments, the detergent compositions do not include silicates, NTA, phosphates and/or phosphonates.

The compositions may also include additional defoaming agents, anti-redeposition agents, bleaching agents, solubility modifiers, dispersants, rinse aids, metal protecting agents (anti-etch), enzymes, stabilizing agents, corrosion inhibitors, metal catalysts, additional sequestrants and/or chelating agents, fragrances and/or dyes, rheology modifiers or thickeners, hydrotropes or couplers, buffers, solvents and the like.

Defoaming Agents

The detergent compositions disclosed herein may optionally include a defoaming agent. The defoaming agent is preferably a nonionic surfactant. In a preferred embodiment, the defoaming agent is a nonionic alkoxylated surfactant. In another preferred embodiment, the defoaming agent is a nonionic surfactant having a formula RO—$(PO)_{0-5}(EO)_{1-30}(PO)_{1-30}$, or RO—$(PO)_{1-30}(EO)_{1-30}(PO)_{1-30}$, wherein R is a $C_{8-18}$ linear or branched alkyl group; EO=ethylene oxide; PO=propylene oxide. Exemplary suitable alkoxylated surfactants include ethylene oxide/propylene block copolymers (EO/PO copolymers), such as those available under the name Pluronic or Plurafac®, capped EO/PO copolymers, partially capped EO/PO copolymers, fully capped EO/PO copolymers, alcohol alkoxylates, capped alcohol alkoxylates, mixtures thereof, or the like.

Other defoaming agents can include silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Nonionic surfactants generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. According to the invention, the nonionic surfactant useful in the composition is a low-foaming nonionic surfactant. Examples of nonionic low foaming surfactants useful in the present invention include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Dow.

Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

Compounds with the following structure: $RO—(PO)_{0-5}(EO)_{1-30}(PO)_{1-30}$, wherein R is a C8-18 linear or branched alkyl group; EO=ethylene oxide; PO=propylene oxide.

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Alkoxylated diamines produced by the sequential addition of propylene oxide and ethylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic™ Surfactants.

Alkoxylated diamines produced by the sequential addition of ethylene oxide and propylene oxide to ethylenediamine. The hydrophobic portion of the molecule weighs from 250 to 6,700 with the central hydrophile including 0.1% by weight to 50% by weight of the final molecule. Examples of commercial compounds of this chemistry are available from BASF Corporation under the tradename Tetronic R™ Surfactants.

Compounds disclosed herein which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

Alkoxylated amines or, most particularly, alcohol alkoxylated/aminated/alkoxylated surfactants. These non-ionic surfactants may be at least in part represented by the general formulae:

$$R^{20}—(PO)_sN—(EO)_tH,$$

$$R_{2}0—(PO)_sN—(EO)_tH(EO)_tH, \text{ and}$$

$$R^{20}—N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}—(PO)_v—N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic PEA 25 Amine Alkoxylate.

In an embodiment, the detergent compositions include from about 0 wt-% to about 15 wt-% of the defoaming agent, from about 0.5 wt-% to about 10 wt-% of the defoaming agent, from about 0.5 wt-% to about 5 wt-% of the defoaming agent, and preferably from about 0.5 wt-% to about 3 wt-%, about 1 wt-%, about 3 wt-%, about 5 wt-%, or about 10 wt-% of the defoaming agent. In addition, without being limited according to the detergent compositions disclosed herein, all ranges recited are inclusive of the numbers defining the range and include each integer within the defined range.

Phosphonates

In some embodiments, the claimed detergent compositions may include a phosphonate. Examples of phosphonates include, but are not limited to: phosphinosuccinic acid oligomer (PSO) described in U.S. Pat. Nos. 8,871,699 and 9,255,242; 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid). $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5(x=7)$; hexamethylenediamine(tetramethylenephosphonate), potassium salt, $C_{10}H_{(28-x)}N_2K_xO_{12}P_4(x=6)$; bis(hexamethylene)triamine (pentamethylenephosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the claimed detergent composition is phosphorous-free.

Suitable amounts of the phosphonates included in the detergent compositions disclosed here are between about 0% and about 25% by weight of the detergent compositions, between about 0.1% and about 20%, between about 0% and about 15%, between about 0% and about 10%, between about 0% and about 5%, between about 0.5% and about 10%, between about 0.5% and about 5%, or between about 0.5% and about 15% by weight of the detergent compositions.

Surfactants

In some embodiments, the detergent composition disclosed herein include a surfactant. In some other embodiments, the detergent compositions disclosed herein include a nonionic defoaming surfactant or agent. In some other embodiments, the detergent compositions disclosed herein include an additional surfactant together with a nonionic defoaming surfactant or agent. Surfactants suitable for use with the detergent compositions disclosed herein include, but are not limited to, additional nonionic surfactants, anionic surfactants, cationic surfactants and zwitterionic surfactants. In yet some other embodiments, the detergent compositions disclosed herein is free of any additional surfactant other than one or more nonionic defoaming surfactants or agents.

In some embodiments, the detergent compositions disclosed herein include, in addition to the nonionic defoaming surfactant or agent, about 0 wt-% to about 50 wt-% of an additional surfactant, from about 0 wt-% to about 25 wt-%, from about 0 wt-% to about 15 wt-%, from about 0 wt-% to about 10 wt-%, or from about 0 wt-% to about 5 wt-%, about 0 wt-%, about 0.5 wt-%, about 1 wt-%, about 3 wt-%, about 5 wt-%, about 10 wt-%, or about 15 wt-% of an additional surfactant.

Anionic Surfactants

Also useful in the detergent compositions disclosed herein are surface active substances which are categorized as anionic surfactants because the charge on the hydrophobic group is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty detergent compositions.

Anionic sulfate surfactants suitable for use in the claimed detergent compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the claimed detergent compositions also include alkyl sulfonates, the linear and branched primary and secondary alkyl sulfonates, and the aromatic sulfonates with or without substituents.

Anionic carboxylate surfactants suitable for use in the claimed detergent compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

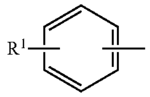
, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

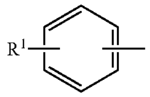

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Cationic Quaternary Surfactant/Quaternary Alkyl Amine Alkoxylate

The cationic quaternary surfactants are substances based on nitrogen centered cationic moieties with net positive change. Suitable cationic surfactants contain quaternary ammonium groups. Suitable cationic surfactants especially include those of the general formula: $N^{(+)}R^1R^2R^3R^4X^{(-)}$, wherein $R^1$, $R^2$, $R^3$ and $R^4$ independently of each other represent alkyl groups, aliphatic groups, aromatic groups, alkoxy groups, polyoxyalkylene groups, alkylamido groups, hydroxyalkyl groups, aryl groups, $H^+$ ions, each with from 1 to 22 carbon atoms, with the provision that at least one of the groups $R^1$, $R^2$, $R^3$ and $R^4$ has at least eight carbon atoms and wherein X(−) represents an anion, for example, a halogen, acetate, phosphate, nitrate or alkyl sulfate, preferably a chloride. The aliphatic groups can also contain cross-linking or other groups, for example additional amino groups, in addition to the carbon and hydrogen atoms.

Particular cationic active ingredients include, for example, but are not limited to, alkyl dimethyl benzyl ammonium chloride (ADBAC), alkyl dimethyl ethylbenzyl ammonium chloride, dialkyl dimethyl ammonium chloride, benzethonium chloride, N, N-bis-(3-aminopropyl) dodecylamine, chlorhexidine gluconate, an organic and/or organic salt of chlorhexidene gluconate, PHMB (polyhexamethylene biguanide), salt of a biguanide, a substituted biguanide derivative, an organic salt of a quaternary ammonium containing compound or an inorganic salt of a quaternary ammonium containing compound or mixtures thereof.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

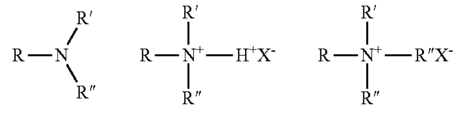

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

Preferred cationic quaternary ammonium compound can be schematically shown as:

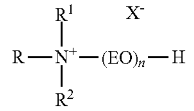

in which R represents a C8-C18 alkyl or alkenyl; $R^1$ and $R^2$ are C1-C4 alkyl groups; n is 10-25; and x is an anion selected from a halide or methyl sulfate.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the claimed detergent compositions herein include those having the formula $R^1_mR^2_xYLZ$ wherein each $R^1$ is an organic group containing a straight or branched alkyl or alkenyl group optionally substituted with up to three phenyl or hydroxy groups and optionally interrupted by up to four of the following structures:

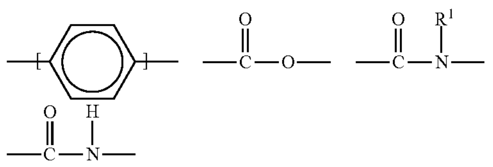

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

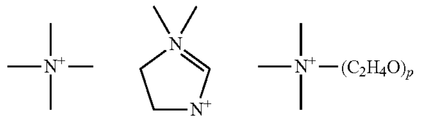

p = about 1 to 12

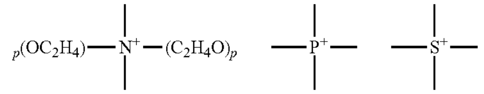

p = about 1 to 12

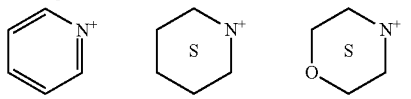

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Suitable concentrations of the cationic quaternary surfactant in the claimed detergents compositions may be between about 0% and about 10% by weight of the claimed detergent compositions.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

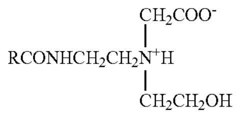

(MONO)ACETATE

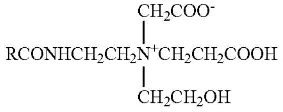

(DI)PROPIONATE

Neutral pH Zwitterion

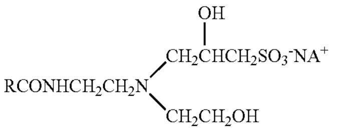

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong" inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

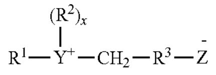

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

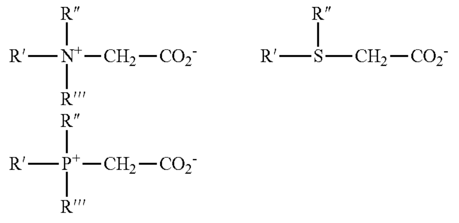

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Enzymes

The detergent compositions disclosed herein can further include an enzyme to provide enhanced removal of soils, prevention of redeposition and additionally the reduction of foam in use solutions of the cleaning compositions. The purpose of the enzyme is to break down adherent soils, such as starch or proteinaceous materials, typically found in soiled surfaces and removed by a detergent composition into a wash water source. The enzyme can remove soils from substrates and prevent redeposition of soils on substrate surfaces. Enzymes also provide additional cleaning and detergency benefits, such as anti-foaming.

Exemplary types of enzymes which can be incorporated into detergent compositions or detergent use solutions include amylase, protease, lipase, cellulase, cutinase, glucoNase, peroxidase and/or mixtures thereof. The detergent compositions disclosed herein may employ more than one enzyme, from any suitable origin, such as vegetable, animal, bacterial, fungal or yeast origin. However, according to a preferred embodiment of the detergent compositions disclosed herein, the enzyme is a protease. As used herein, the terms "protease" or "proteinase" refer enzymes that catalyze the hydrolysis of peptide bonds.

As one skilled in the art shall ascertain, enzymes are designed to work with specific types of soils. For example, according to an embodiment of the invention, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases. Examples of commercially-available protease enzymes are available under the following trade names: Esperase, Purafect, Purafect L, Purafect Ox, Everlase, Liquanase, Savinase, Prime L, Prosperase and Blap.

For the detergent compositions disclosed herein, the enzyme may be varied based on the particular cleaning application and the types of soils in need of cleaning. For example, the temperature of a particular cleaning application will impact the enzymes selected for the detergent compositions disclosed herein. Ware wash applications, for example, clean substrates at temperatures in excess of approximately 60° C., or in excess of approximately 70° C., or between approximately 65°-80° C., and enzymes such as proteases are desirable due to their ability to retain enzymatic activity at such elevated temperatures.

The enzymes for the detergent compositions disclosed herein may be an independent entity and/or may be formulated in combination with the detergent compositions. In addition, enzymes may be formulated into various delayed or controlled release formulations. For example, a solid molded detergent composition may be prepared without the addition of heat. As a skilled artisan will appreciate, enzymes tend to become denatured by the application of heat and therefore use of enzymes within the claimed detergent compositions require methods of forming the detergent compositions that does not rely upon heat as a step in the formation process, such as solidification.

The enzyme may further be obtained commercially in a solid (i.e., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the present invention.

Alternatively, an enzyme(s) may be provided separate from the claimed detergent composition, such as added directly to the wash liquor or wash water of a particular application of use, e.g. dishwasher.

Additional description of enzymes suitable for use in the detergent compositions disclosed herein is disclosed for example in U.S. Pat. Nos. 7,670,549, 7,723,281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and Eckart, D.) Vol. 9, pp. 173-224, John Wiley & Sons, New York, 1980 is incorporated herein in its entirety.

In a preferred embodiment, the enzyme provided in the detergent compositions disclosed herein is in an amount of between about 0.01 wt-% to about 40 wt-%, between about 0.01 wt-% to about 30 wt-%, between about 0.01 wt-% to about 10 wt-%, between about 0.1 wt-% to about 5 wt-%, and preferably between about 0.5 wt-% to about 2 wt-% of the detergent compositions.

Methods of Making/Methods of Improving Solid Block Hardness

The solid compositions disclosed herein can be formed by combining the components in the weight percentages and ratios disclosed herein. The detergent compositions disclosed herein can be provided as a solid and a use solution is formed during the ware washing processes (or other application of use).

The solid detergent compositions disclosed herein can be formed using the hardness additive composition, which can be provided as a premix or individual components of the hardness additive composition can be individually mixed with additional components of the detergent composition and mixed at a point of manufacture. The methods include mixing the hardness additive composition with the detergent composition components to form a homogenous mixture. The methods further include a step of pressing the mixture into a mold to form a solid composition.

The methods of producing solids can be done using a batch or continuous mixing system. In an exemplary embodiment, a single- or twin-screw extruder is used to combine and mix one the components, including optionally at high shear, to form a homogeneous mixture. The solid detergent compositions processed according to the methods of the invention are substantially homogeneous with regard to the distribution of ingredients throughout its mass and is dimensionally stable.

Specifically, in a forming process, both liquid and solid components are introduced into a final mixing system and are continuously mixed until the components form a substantially homogeneous semi-solid mixture in which the components are distributed throughout its mass. In an exemplary embodiment, the components are mixed in the mixing system for at least approximately 5 seconds, for at least approximately 15 seconds, for at least approximately 30 seconds, or greater. The mixture is then discharged from the mixing system into a mold for pressing. The solid is removed from the mold and unexpectedly provides an immediately hardened solid, such as a solid block where the edges are not brittle and do not require a curing step. In an embodiment, the solids are not cured.

Various pressures can be used to form solid compositions. For example, in some embodiments methods of making the solids can employ a pressure on the solid of up to about 90,000 psi, up to about 80,000 psi, up to about 70,000 psi, or up to about 60,000 psi.

The immediate hardening of the pressed solids beneficially aids to maintain physical integrity through the mechanical conveying system, including ejection from the press molds. The solid can be packaged immediately upon ejection or removal from the press mold. In an exemplary embodiment, the formed solid begins to harden to a solid form immediately, with a few seconds to approximately 1 minute. The solids do not exhibit brittle edges, large or small chips and/or gauges or chunks that fall apart due to breakage during the mechanical conveying system of the pressing. This beneficially permits a continuous processing or production system that does not require solid blocks to be cured, which generally requires solid blocks to be removed from the conveying system (and often requires additional time before packaging).

The resulting solid detergent composition may take forms including, but not limited to: a pressed solid block. The solids can be formed into various shapes based upon the selection of a desired mold. The weight and size of the solids can vary as a skilled artisan will appreciate, including between approximately 50 grams and approximately 250 grams, approximately 100 grams or greater, or between approximately 1 and approximately 10 kilograms. In some embodiments, the solid composition may be dissolved, for example, in an aqueous or other medium, to create a concentrated and/or use solution. The solution may be directed to a storage reservoir for later use and/or dilution, or may be applied directly to a point of use.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the solid detergent compositions, hardness additive compositions, and methods of making the same, disclosed herein are further defined in the following non-limiting Examples. It should be understood that these Examples, while indicating certain embodiments of the detergent compositions, hardness additive compositions, and methods of making the same, disclosed herein, are given by way of illustration only. From the above discussion and these Examples, one skilled in the art can ascertain the essential characteristics of the embodiments, and without departing from the spirit and scope thereof, can make various changes and modifications of the embodiments of the detergent compositions disclosed herein to adapt it to various usages and conditions. Thus, various modifications of the embodiments disclosed herein, in addition to those shown and described herein, will be apparent to those skilled in the art from the foregoing description. Such modifications are also intended to fall within the scope of the appended claims.

Various solid detergent compositions were evaluated as shown in Table 3 in the Examples. Various components employed in Table 3 refer to both generic and commercial names including:

Ash-Sodium carbonate;

Trilon M-methylglycine-N,N-diacetic acid sodium salt (MGDA), 78% active;

EDTA-ethylenediamine-N,N-tetraacetic acid, 99% active;

GLDA—N,N-Dicarboxymethyl glutamic acid tetrasodium salt;

Acusol 445-polyacrylic acid available from DOW Chemical;

Acusol 944-acrylic acid homopolymer available from DOW Chemical;

Enzyme—protease enzyme.

TABLE 3A

| NAME | Negative Control P0 | P1 | P2 | P3 | P4 | P7 | Positive Control P8 | Positive Control P9 |
|---|---|---|---|---|---|---|---|---|
| ASH (100%) | 70.25 | 68.25 | 68.25 | 68.25 | 68.25 | 68.25 | 56.80 | 67.00 |
| ETCH PROTECTANT | <0.5 | <0.5 | <0.5 | <0.5 | <0.5 | <0.5 | <0.5 | 0.00 |
| HYDROXIDE | 0.00 | 0.00 | 0.00 | 0.00 | 0.00 | 0.00 | 3.56 | 0.00 |
| EDTA (100%) | 2.50 | 2.50 | 2.50 | 2.50 | 2.50 | 2.50 | 0.00 | 0.00 |
| TRILON M (100%) | 15.08 | 15.08 | 15.08 | 15.08 | 15.08 | 14.08 | 0.00 | 3.50 |
| GLDA (47%) | 2.50 | 2.50 | 1.79 | 2.50 | 1.79 | 2.50 | 0.00 | 0.00 |
| HEDP (60%) | 0.00 | 0.00 | 0.00 | 0.00 | 0.00 | 0.00 | 6.69 | 0.00 |
| LIQUID EDTA (40%) | 4.50 | 4.50 | 3.21 | 4.50 | 3.21 | 4.50 | 0.00 | 4.50 |
| ACUSOL 445 (48%) | 0.00 | 2.00 | 4.00 | 0.00 | 0.00 | 2.00 | 3.56 | 3.50 |
| ACUSOL 944 (47%) | 0.00 | 0.00 | 0.00 | 2.00 | 4.00 | 0.00 | 0.00 | 0.00 |
| NONIONIC SURFACTS | 4.00 | 4.00 | 4.00 | 4.00 | 4.00 | 4.00 | 4.00 | 4.50 |
| ENZYME | 1.00 | 1.00 | 1.00 | 1.00 | 1.00 | 1.00 | 0.00 | 0.00 |
| STPP | 0.00 | 0.00 | 0.00 | 0.00 | 0.00 | 0.00 | 25.00 | 25.00 |
| SODIUM SILICATE | 0.00 | 0.00 | 0.00 | 0.00 | 0.00 | 0.00 | 0.00 | 17.00 |
| | 100.00 | 100.00 | 100.00 | 100.00 | 100.00 | 100.00 | 100.00 | 100.00 |
| Acusol/Trilon M | 0.00 | 0.06 | 0.13 | 0.06 | 0.12 | 0.07 | N/A | 0.48 |
| Acusol/GLDA + EDTA | 0.00 | 0.18 | 0.42 | 0.17 | 0.41 | 0.18 | N/A | N/A |
| Acusol/EDTA | 0.00 | 0.22 | 0.51 | 0.22 | 0.50 | 0.22 | N/A | N/A |
| Acusol/Dense Ash | 0.00 | 0.02 | 0.03 | 0.02 | 0.00 | 0.02 | 0.03 | 0.03 |

TABLE 3B

| NAME | Positive Control P10 | P11 | P12 | P13 | P14 | P15 | P16 | P17 | P18 |
|---|---|---|---|---|---|---|---|---|---|
| ASH (100%) | 80.4 | 66.25 | 70.25 | 68.25 | 68725 | 65.25 | 80.25 | 74.00 | 69.25 |
| ETCH PROTECTANT | 0.00 | <0.5 | <0.5 | <0.5 | <0.5 | <0.5 | <0.5 | <0.5 | <0.5 |
| HYDROXIDE | 1.10 | 0.00 | 0.00 | 0.00 | 0.00 | 0.00 | 0.00 | 0.00 | 0.00 |

TABLE 3B-continued

| NAME | Positive Control P10 | P11 | P12 | P13 | P14 | P15 | P16 | P17 | P18 |
|---|---|---|---|---|---|---|---|---|---|
| EDTA (100%) | 0.00 | 2.50 | 2.50 | 2.50 | 2.50 | 2.50 | 2.50 | 2.50 | 1.00 |
| TRILON M (100%) | 2.00 | 15.08 | 14.08 | 14.08 | 14.08 | 14.08 | 4.80 | 14.08 | 14.08 |
| GLDA (47%) | 0.00 | 3.21 | 2.50 | 2.50 | 2.50 | 2.50 | 2.50 | 0.50 | 2.50 |
| LIQUID EDTA (40%) | 0.00 | 5.79 | 4.50 | 4.50 | 4.50 | 4.50 | 4.50 | 1.75 | 1.00 |
| ATMP | 1.11 | 0.00 | 0.00 | 0.00 | 0.00 | 0.00 | 0.00 | 0.00 | 0.00 |
| ACUSOL 45 (48%) | 0.00 | 2.00 | 1.00 | 3.00 | 4.00 | 6.00 | 2.00 | 2.00 | 2.00 |
| ACUSOL 944 (47%) | 0.00 | 2.00 | 1.00 | 3.00 | 4.00 | 6.00 | 2.00 | 2.00 | 2.00 |
| ACUSOL 448 (48%) | 3.42 | 0.00 | 0.00 | 0.00 | 0.00 | 0.00 | 0.00 | 0.00 | 0.00 |
| NONIONIC SURFACTS | 4.00 | 4.00 | 4.00 | 4.00 | 4.00 | 4.00 | 3.00 | 4.00 | 4.00 |
| ENZYME | 0.50 | 1.00 | 1.00 | 1.00 | 1.00 | 1.00 | 1.00 | 1.00 | 1.00 |
| ANTISCALANT | 3.42 | 0.00 | 0.00 | 0.00 | 0.00 | 0.00 | 0.00 | 0.00 | 0.00 |
| LIQUID SUCROSE | 1.11 | 0.00 | 0.00 | 0.00 | 0.00 | 0.00 | 0.00 | 0.00 | 17.00 |
| SODIUM CITRATE | 2.50 | 0.00 | 0.00 | 0.00 | 0.00 | 0.00 | 0.00 | 0.00 | 0.00 |
| | 100.00 | 100.00 | 100.00 | 100.00 | 100.00 | 100.00 | 100.00 | 100.00 | 100.00 |
| Acusol/Trilon M | 0.00 | 0.06 | 0.03 | 0.10 | 0.14 | 0.20 | 0.24 | 0.07 | 0.07 |
| Acusol/GLDA + EDTA | N/A | 0.15 | 0.09 | 0.26 | 0.35 | 0.53 | 0.18 | 0.23 | 0.37 |
| Acusol/EDTA | N/A | 0.20 | 0.11 | 0.33 | 0.45 | 0.67 | 0.22 | 0.30 | 0.69 |
| Acusol/Dense Ash | 0.00 | 0.02 | 0.01 | 0.02 | 0.03 | 0.05 | 0.01 | 0.02 | 0.02 |

Example 1

Edge hardness of blocks were evaluated according to the following procedures:

1. Within 2 minutes from the pressed block being ejected from the press, take the block off the conveyor line.
2. Insert the pressed block into a plastic container capable of gathering all the loose powder that will fall from the block. The bottom of the block should be in contact with the plastic container.
3. With both hands (using chemical resistant gloves) grab the top ¼ of the block. Rock the block back and forth 6 times to loosen any powder on the edge of the block.
4. Immediately after rocking the block, roll the block around the complete bottom edge of the block, twice clockwise and twice counter clockwise.
5. The last step in removing the loose powder is to take an available hand and brush off any remaining loose powder that has not fallen into the plastic container. The last step does not force powder off the block; instead removes loose particulate.
6. Take the remaining powder in the plastic container, weigh it and record the number.
7. Repeat this method with at least 5 blocks from every batch. For long, full production batches, take 5 blocks from the beginning, middle and end of the batch.

These methods are intended to quantify the loss in mass (grams) from weak bottom edges in a pressed block composition. The threshold for acceptable loss of loose powder is a scale determined result based on the commercial production of the product. For example, for a 3000 gram solid block less than about 0.7 grams of lost loose powder is required. The least amount of block mass loss (measured through total weight of loose powder) is desired. In an embodiment, from a manufacturing perspective the goal is to obtain at least about 95%, or preferably 97% yield from production (representing a 5%, or 3% loss or "scrap rate", respectively).

Initial production of P0 formulation (Control without the hardness additive composition) yielded significantly greater loss rates and was unable to achieve the 97% production yield. The evaluations are intended to identify compositions containing hardness additive compositions that improve over the P0 (Control) in terms of total lose powder loss. According to the boxplots a desired threshold for loss of powder mass is less than 3.54 grams (indicative of a 25% scrap rate), preferably less than 1.82 grams (indicative of a 5% scrap rate or less), and most preferably <1.08 grams. A measurement between 1.82 grams and 2.75 grams results in a scrap rate of less than about 5%, and below 1.36 grams is about 0% scrap rate, based upon a 3000 gram solid block composition. One skilled in the art are able to calculate the desired scrap rates based on different sizes (i.e. total block weight) of solid compositions employing the hardness additive compositions.

An evaluation of the assessment of total loose powder from P0 (Control blocks without the hardness additive composition) compared to P1 and P7 formulations was conducted. The results are shown in FIG. 1 in a boxplot showing the total loose powder from three evaluations; first evaluation included a 12-13 day curing of the blocks (providing the blocks additional 12-13 days for hardening of the blocks); second and third evaluations did not include curing, instead the edge hardness assessment was conducted immediately after the blocks were removed from the press mold. The first data set evaluating formulation P0 (Control without the hardness additive composition) even after curing for 12-13 days exhibited loss of powder from the blocks that exceeds an acceptable threshold. Composition P7 demonstrated approximately <1.82 gram loss and P1 demonstrated approximately <2.75 gram loss, illustrating the hardness additive compositions in the formulations improve the edge hardness immediately after pressing (no curing period).

Example 2

Figure 2:
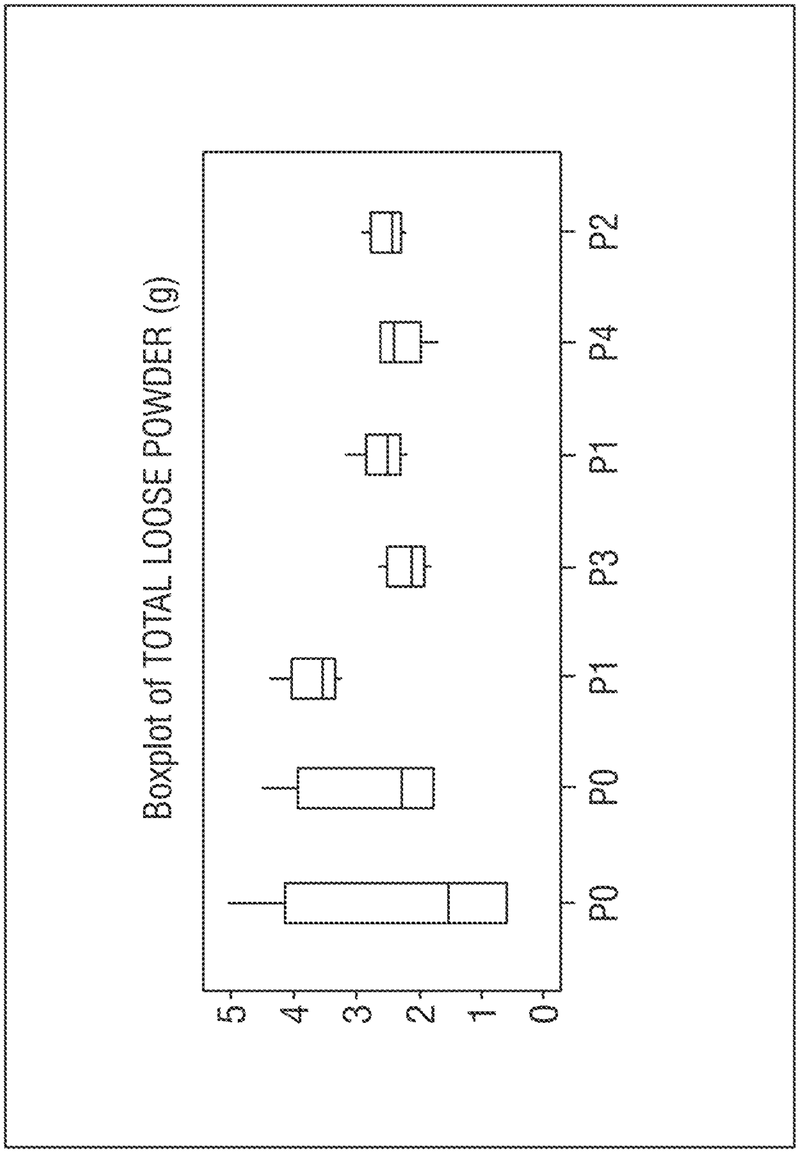
FIG. 2 shows a boxplot of total loose powder lost on a pressed solid production for formulations containing hardness additive compositions compared ton negative Control formulations.

Edge hardness of additional blocks of formulations P0 compared to P1, P2, P3 and P4 were conducted according to the Formulas of Table 3 and the methods set forth in Example 1. As shown in FIG. 2, the negative controls P0 continued fail to show sufficient block hardness as measured by the total loose powder mass loss. Improved block hardness was exhibited by formulas P1, P2, P3 and P4 demonstrating a decrease in total loose powder mass loss. Each of these formulations demonstrated approximately <2.75 gram loss, illustrating the hardness additive compositions in the formulations improve the edge hardness immediately after pressing (no curing period).

Example 3

Figure 3:
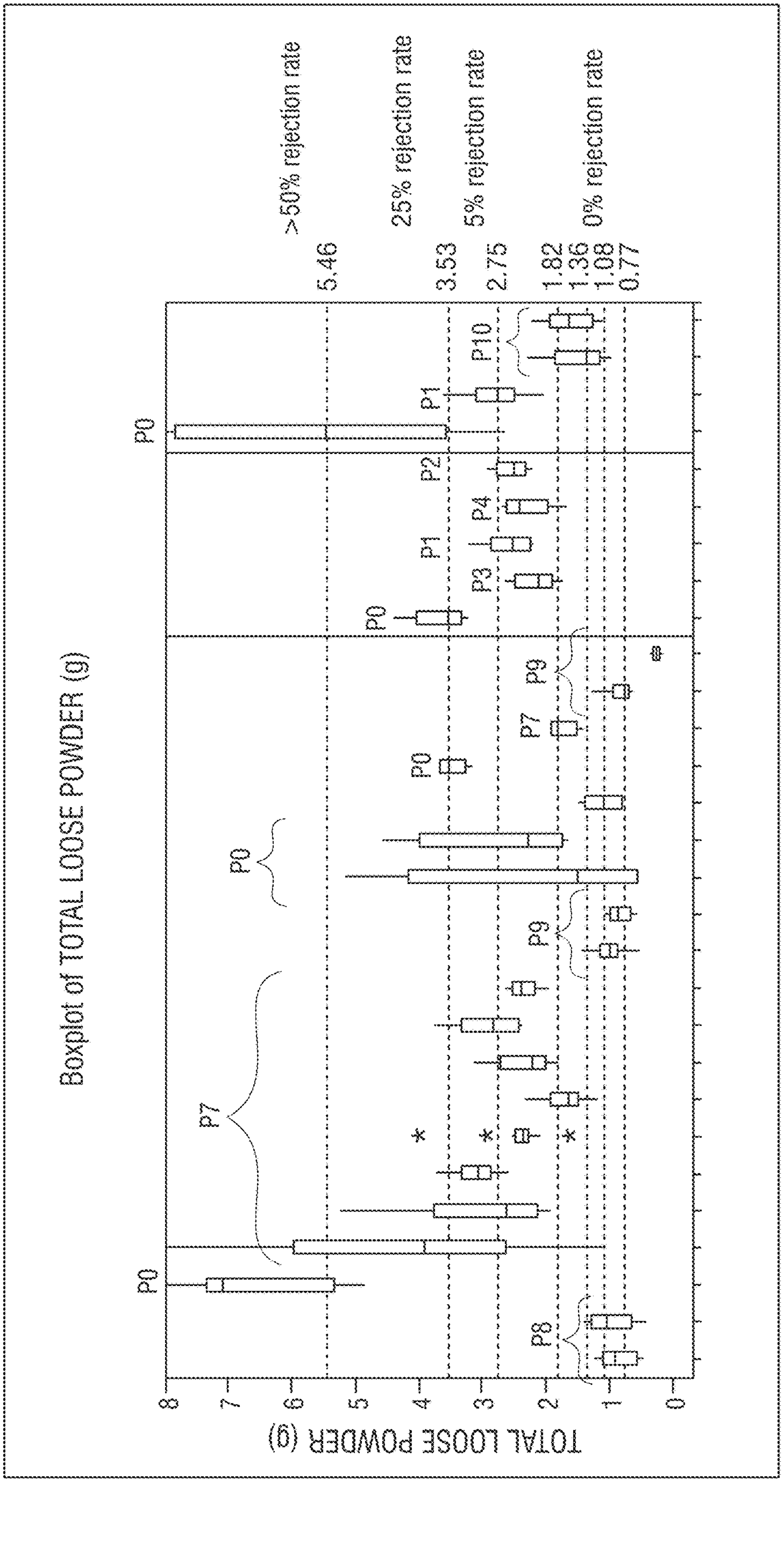
FIG. 3 shows a boxplot of total loose powder lost at four pressed solid runs comparing Control formulations (with (positive control) and without (negative control) the hardness additive composition) with formulations containing hardness additive compositions to demonstrate improvement in immediate block edge hardness.

Edge hardness of additional blocks of formulations P1, P2, P3, P4, P7, P8 (positive control), and P9 (positive control) were conducted according to the Formulas of Table 3 and the methods set forth in Example 1. Testing was conducted for P8 and P0 at a separate location (same set up and methodology) from the remainder of the testing. As illustrated in FIG. 3 in addition to the mass weight loss (grams) of the blocks the overall percentage of the pressed blocks that were considered failures due to insufficient hardening immediately off the press causes loss of powder due to brittle edges of the blocks. As shown the thresholds mentioned in Example 1 as commercially acceptable have 5% or less of block failure over all, preferably 0% failure.

FIG. 3 shows P0 negative Control formulations resulted in pressed solids with unacceptable levels of loose powder mass lost, including at least 25% or at least 50% rejection rates. The P0 formulations were not allowed to cure (unlike Example 1 and FIG. 1), showing that the immediate block hardness of P0 negative Control was worse than the cured block strength. This further demonstrates that the block hardness immediately after pressing the solids is a more difficult condition to meet. The variation in P7 formulations resulted from removal of 1% Trilon M from P1, resulting in wetter formulas. FIG. 3 also shows improved block hardness compared to P0 for various evaluated formulations P1, P2, P3, P4, and P7. The positive Controls P8, P9, P10 which do not include the hardening additive composition also perform well providing immediate hardness, which is believed to be as a result of the P8 and P9 formulas not containing Acusol 445 and P10 containing Acusol 448, resulting in a P8 formula that has an increase in phosphate in the formula and P9 being a silicated formula.

Figure 4:
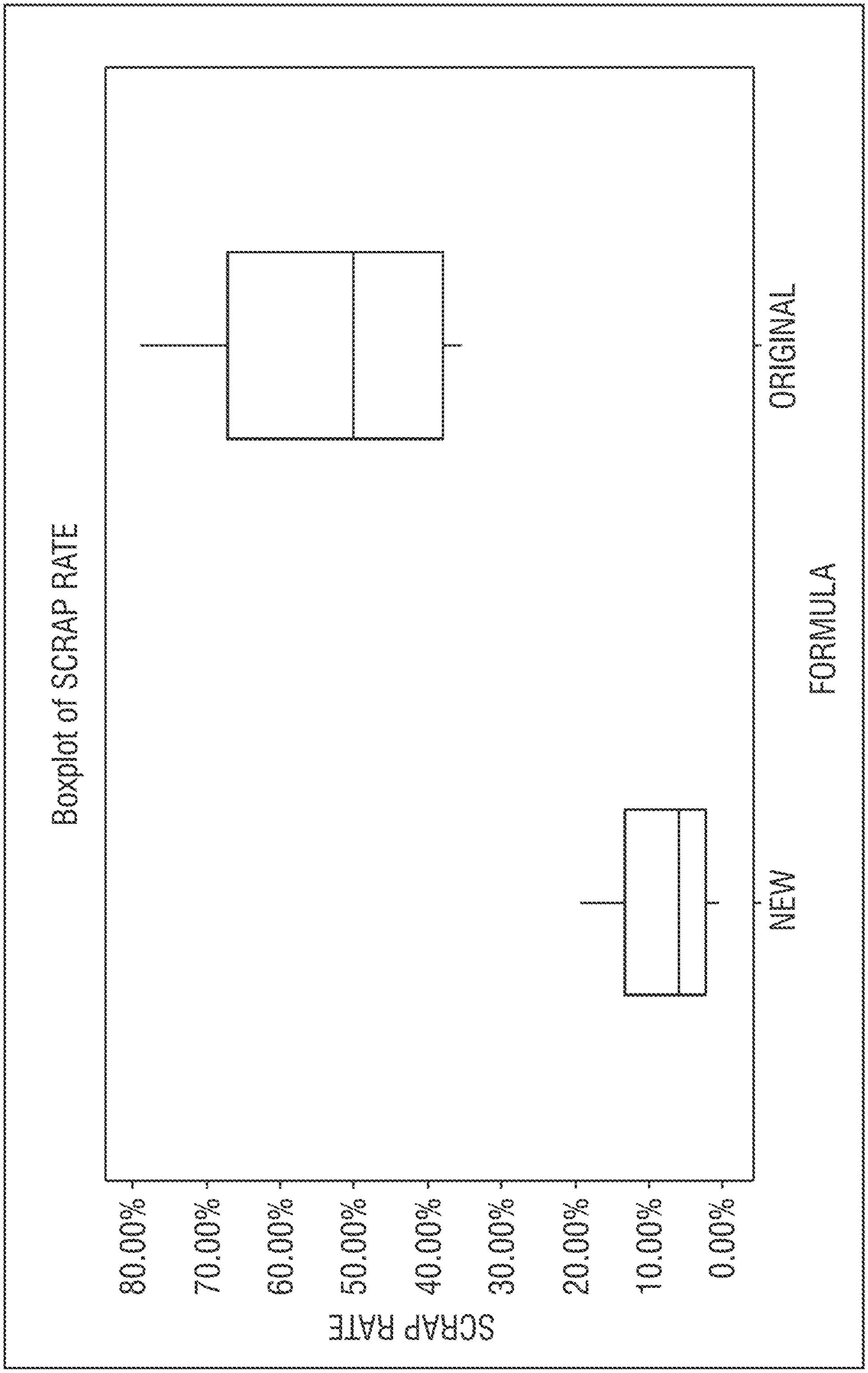
FIG. 4 shows a boxplot comparison of scrap rate of produced pressed solids containing the hardness additive composition ("New") compared to formulations without the hardness additive composition ("Original").

FIG. 4 shows an overall comparison to all evaluated formulations containing the hardness additive composition ("New") compared to formulations without the hardness additive composition ("Original") based on the scrap rate of the production process. As shown there is a statistically significant improvement in immediate block hardness with the hardness additive composition. Less than about a 5% scrap rate is the desired commercial outcome for the improved solid compositions containing the hardness additive compositions. As referred to herein a scrap rate refers to the commercial production threshold of number of blocks per 100 that do not meet commercially acceptable standards, such as blocks have any chunks of formula missing following ejection from a press mold, or for a 3000 gram solid block less than about 0.7 grams of lost loose powder inside the shrink wrap and chunks larger than 1" in diameter. As shown there is a significant reduction in the scrap rate for the New formulations containing the hardness additive composition.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of improving solid block hardness comprising: combining

A) a hardness additive composition;

B) an alkalinity source;

C) at least one surfactant; and

D) at least one additional functional ingredient; mixing to form a homogenous mixture; and pressing in a mold to form a solid composition, wherein the solid is a block having edge hardness immediately upon pressing and removal from the mold, wherein the hardness additive composition comprises:

1) from about 5 wt-% to about 40 wt-% of at least one polycarboxylic acid polymer chelant comprising a polyacrylate or polyacrylic acid polymer or homopolymer; and 2) from about 60 wt-% to about 95 wt-% of an aminocarboxylate chelant mixture comprising ethylenediamine-N,N-tetraacetic acid (EDTA), methylglycinediacetic acid (MGDA), and L-glutamic acid, N,N-diacetic acid (GLDA);

wherein the ratio of polycarboxylic acid polymer chelant (s) to L-glutamic acid, N,N-diacetic acid (GLDA) or salt thereof in combination with ethylenediamine-N,N-tetraacetic acid (EDTA) or salt thereof, is between about 0.17:1 to about 0.42:1.

2. The method of claim 1, wherein the method does not include curing of the solid blocks.

3. The method of claim 1, further comprising a step of packaging the solid blocks immediately after pressing and removal from the mold.

4. The method of claim 3, wherein the packaging comprises shrink wrapping.

5. The method of claim 1, where the scrap rate of the solid block production is less than about 5%.

6. The method of claim 1, wherein the ratio of polycarboxylic acid polymer chelant(s) to methylglycinediacetic acid (MGDA) or salt thereof, is between about 0.06:1 to about 0.12:1.

7. The method of claim 1, wherein the ratio of polycarboxylic acid polymer chelant(s) to ethylenediamine-N,N-tetraacetic acid (EDTA) or salt thereof, is between 0.2:1 to about 0.5:1.

8. The method of claim 1, wherein the ratio of polycarboxylic acid polymer chelant(s) to methylglycinediacetic acid (MGDA) or salt thereof, is between about 0.06:1 to about 0.12:1; and the ratio of polycarboxylic acid polymer chelant(s) to ethylenediamine-N,N-tetraacetic acid (EDTA) or salt thereof, is between about 0.2:1 to about 0.5:1.

9. The method of claim 1, wherein the alkalinity source is an alkali metal carbonate.

10. The method of claim 1, wherein the surfactant is a nonionic surfactant.

11. The method of claim 10, wherein the nonionic surfactant comprises an alcohol ethoxylate and/or ethylene oxide/propylene oxide block copolymers.

12. The method of claim 1, wherein the additional functional ingredient comprises an additional chelant.

13. The method of claim 1, wherein the solid composition comprises from about 15 wt-% to about 50 wt-% of the hardness additive composition, from about 20 wt-% to about 90 wt-% of the alkali metal alkalinity source, from about 1 wt-% to about 25 wt-% of the nonionic surfactant, and from about 1 wt-% to about 20 wt-% of the additional functional ingredients.

14. The method of claim 1, the additional functional ingredient comprises at least one enzyme.

15. The method of claim 1, wherein the solid composition is free of silicates, NTA, phosphates and/or phosphonates.

* * * * *